R. ELLIOTT.

SHEDDING MECHANISM FOR LOOMS.

No. 6,793 Reissued Dec. 14, 1875.

Witnesses:

L. F. Brous

A. P. Grant.

Inventor:

Robert Elliott by John A. Wiedersheim

Att'y.

N. PETERS, PHOTO-LITHOGRAPHER, WASHINGTON, D. C.

UNITED STATES PATENT OFFICE.

ROBERT ELLIOTT, OF CHESTER, PENNSYLVANIA.

IMPROVEMENT IN SHEDDING MECHANISMS FOR LOOMS.

Specification forming part of Letters Patent No. 110,640, dated January 3, 1871; reissue No. 6,793, dated December 14, 1875; application filed May 31, 1875.

*To all whom it may concern:*

Be it known that I, ROBERT ELLIOTT, of Chester, in the county of Delaware and State of Pennsylvania, have invented a new and useful Improvement in Looms; and I do hereby declare the following to be a clear and exact description of the nature thereof, sufficient to enable others skilled in the art to which my invention appertains to fully understand, make, and use the same, reference being had to the accompanying drawings making part of this specification, in which—

Figure 1:
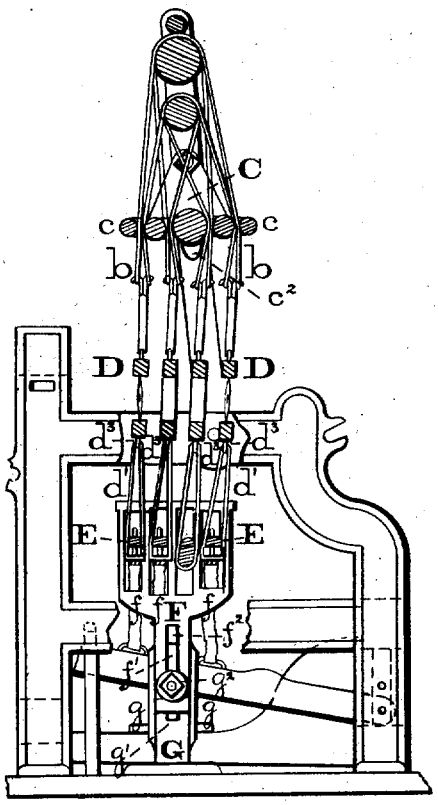
Figure 2:
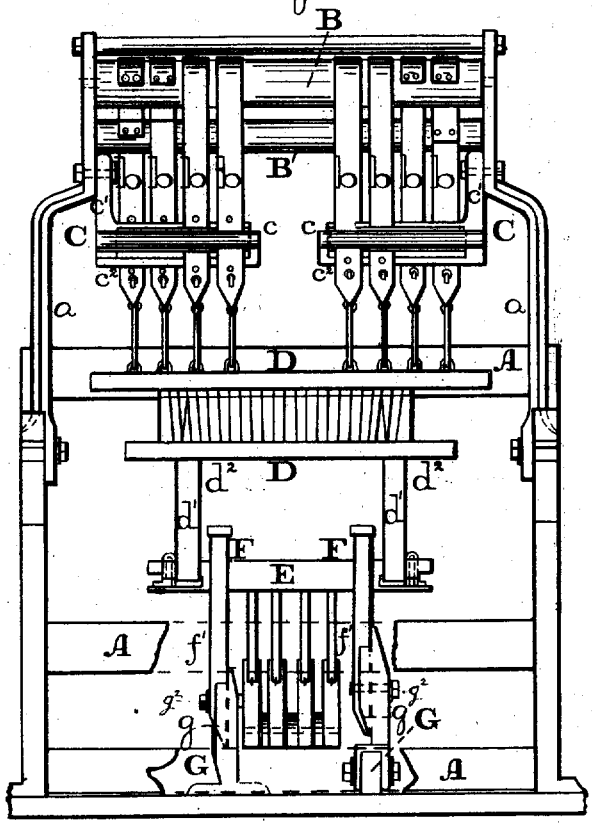
Figure 3:
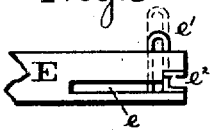
Figure 4:
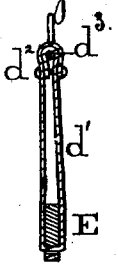

Figure 1 is a side view, partly sectional, of the device embodying my invention. Fig. 2 is a front view thereof. Fig. 3 is a detached view of a portion of the jack-bar. Fig. 4 is a vertical section of one of the straps attached to the heddles and jack-bars.

Similar letters of reference indicate corresponding parts in the several figures.

My invention consists in guide-rollers for the straps, by which the heddles are suspended. It also consists in upright guides for the jack-bars. It also consists in straps constructed to conveniently and firmly connect the heddles and jack-bars. It also consists in an improved mode of attaching to the jack-bars the straps which connect said bars and the heddles.

Referring to the drawings, A represents the frame of the loom, to which are connected uprights *a a*. B represents a series of rollers, which are journaled to the uprights *a*, and C represents a frame, which is pivoted to the said uprights, and it supports a number of parallel-arranged friction-rollers, *c c c*, between which the heddle-straps *b b b* pass to the heddles D, said rollers being constructed of wood or metal, or of wood incased in a metal sleeve, or other suitable material. The frames C may be secured to the uprights *a* by arms $c^1$, and have a brace or bridge piece, $c^2$, extending transversely, for the purpose of strengthening it. $d^1$ represents a strap, which is looped, and at a certain length thereof there is passed therethrough the stem of a pin, $d^3$, said stem projecting through the strap, so as to be attached to the heddle-bar, whereby the heddle-bar and jack-bar will be connected. The pin is T-shaped, and the head thereof rests between the adjacent folds or lengths of the loop, which folds or lengths are riveted together, thus clamping the head between them. In the loops of the straps there are inserted the ends of the jack-bar E. A horizontal slot, *e*, is formed in the jack-bar, and a pin, $e^1$, inserted in the bar at right angles to the slot. When the strap is to be placed in this slot the pin is raised, as shown in dotted lines, and the strap slipped in. The pin is then dropped, and the slot thus closed or locked. The step $e^2$ on the end of the jack-bar checks the upward motion of the pin $e^1$, and prevents it pulling out. The horizontal end of the pin $e^1$ is formed by bending after the pin is inserted into the jack-bar. To prevent the unnecessary wear of the jack-bars and straps attached thereto, I pass the said jack-bars through the upright slots *f f*, made in the guides F F, which guides are fastened to the floor by means of brackets G G. The uprights of these brackets are provided with parallel flanges *g g*, between which the shanks $f^1$ are fitted. Slots $g^1$ are formed in these uprights, to correspond with slots $f^2$ in the shanks $f^1$, and the two uprights and shanks are secured together by means of bolts $g^2$, and a vertical adjustment is thus allowed.

All further connections with the treadles, &c., are of usual construction, and do not necessitate present description.

The operation of my loom differs from that of others of this class in its smooth and almost noiseless movement, and the economical wear of its improved parts, which latter only amounts to one-third, or less, of the wear on unimproved looms. A great advantage is gained in my looms, also, by placing the guide-rollers above and vertical guides below, inasmuch as all noisy and injurious contact is prevented between the bars and frames, and the wear and tear of these parts are thus greatly diminished.

Having thus described my invention, what I claim as new, and desire to secure by Letters Patent, is—

1. The pivoted frame C and guide-rollers *c c*, combined and connected with the heddles, straps, and upper rollers, substantially as and for the purpose set forth.

2. The combination, with the jack-bars, of the guides F with slots *f*, and shanks $f^1$ with slots $f^2$, brackets G with flanges $g$, slots $g^1$, and bolts $g^2$, substantially as and for the purpose set forth.

3. In combination with the heddle and jack-bars, the strap $d^1$, which is formed into a loop, and provided with a headed pin, $d^3$, whose stem projects from the looped strap, and its head is held secured between the folds of the strap, the stem of the pin being connected to the heddle-bar, and the loop of the strap receiving the jack-bar, substantially as and for the purpose set forth.

4. The jack-bar provided with the slot $e$ and pin $e^1$, in combination with the connection $d$ between the jack-bar and heddle, substantially as and for the purpose set forth.

ROBERT ELLIOTT.

Witnesses:

EDW. MCCAREY,

M. B. DELANY.